United States Patent [19]

Ranalli

[11] 4,366,511
[45] Dec. 28, 1982

[54] METHOD AND APPARATUS FOR FORMATTING A MEMORY DISK

[75] Inventor: Charles Ranalli, Burlington, Mass.
[73] Assignee: Nixdorf Computer Corporation, Burlington, Mass.
[21] Appl. No.: 203,191
[22] Filed: Nov. 3, 1980
[51] Int. Cl.³ .............................................. G11B 5/09
[52] U.S. Cl. ...................................... 360/39; 360/48; 360/49
[58] Field of Search .............................. 360/48, 49, 39
[56] References Cited

U.S. PATENT DOCUMENTS 3,824,563 7/1974 Lurz ...................................... 360/48

FOREIGN PATENT DOCUMENTS 2045479 10/1980 United Kingdom .................. 360/48

OTHER PUBLICATIONS

"Virtual Sectoring on a Disk file"—Grossman et al., IBM TDB, vol. 16 #4, Sep. 1973.
"Beneath Apple Dos" Worth et al. ©1981.

Primary Examiner—Vincent P. Canney
Attorney, Agent, or Firm—Krass, Young & Schivley

[57] ABSTRACT

A method and apparatus for formatting a memory disk (10). Information is stored in compressed form in memory (32). Each sequentially different byte of information is accompanied by a numerical variable defining the number of times the byte is to be written on the disk (10). The numerical variable is loaded into a control counter (40) which is decremented every time the byte is written. The same byte is fetched from the memory (32) until the control counter (40) reaches zero.

10 Claims, 3 Drawing Figures

METHOD AND APPARATUS FOR FORMATTING A MEMORY DISK

DESCRIPTION

1. Technical Field

This invention relates generally to computer memory devices and more particularly to a method and apparatus for formatting a memory disk.

2. Background Art

Magnetic disks are enjoying increasing usage as storage devices in computer systems. Many of the memory disks are in the form of thin flexible wafers which are known in the industry as floppy disks or diskettes. The diskettes have a magnetic surface onto which digital information may be written for later retrieval by the computer system.

Typically, the diskette is divided into many radially disposed tracks which are further divided into sectors. In the so-called "hard sectored" diskettes the beginning of each sector is marked by one of a plurality of index holes spaced around the inner hub. However, the popular "soft sectored" diskettes include only one index hole. In a soft sectored diskette, the different sectors must be labelled with certain indentifying information prior to use. This labelling process is referred to as formatting and the identifying information for the sectors is known as a header. The space on the diskette track following each header is reserved for data information whose address is defined by the header; i.e. by track and sector number. The ratio between the number of bytes in the data and the header information is extremely large, often well in excess of 20:1. To obtain the proper spacing of the information around the tracks of the diskette, dummy data information must first be written onto the diskette in its allotted space during formatting. The dummy information is later replaced by valid data after the diskette has been formatted.

In one generally used prior art formatting approach, all of the header and data information is stored in one continuous string in a random access memory (RAM). Under the control of a central processing unit each byte of information is successively fetched from the RAM and written onto the diskette. This technique has several drawbacks. First, the size of the RAM must be relatively large in order to hold all of the data required for the formatting operation. Second, the repetitive fetching and writing of each of the bytes puts an undue burden on the central processing unit. Since the diskette control module is generally but one part of a coordinated computer system, the excessive real time requirements on the processor during the formatting operation restricts its capability of performing other tasks within the system.

The present invention is directed to solving one or more of these problems.

DISCLOSURE OF THE INVENTION

In one aspect of the invention, apparatus for formatting a memory disk is provided in which the digital information is stored in compressed form in a storage device. Each different byte of information includes a numerical variable defining the number of times that that particular byte is to be written onto the disk. The apparatus includes a process control counter which is loaded with the numerical variables. Controller means is provided for writing the information onto the disk for a number of times defined by the numerical variable.

According to the method of the present invention, the information and numerical variable are preferably stored in adjacent locations in the storage device. An address counter is loaded with the address of a location in the storage device. The contents of the address counter is detected to determine whether it is odd or even. The control counter is loaded with the numerical variable when the address counter contents is of one type and then the contents of the address counter is changed. When the contents of the address counter is of the other type, the information is written onto the disk and then the contents of the control counter is changed. The address counter remains fixed until the control counter reaches a predetermined count. Accordingly, the same byte of information is repetitively written onto the disk for the numer of times defined by the contents of the control counter which was previously loaded with the numerical variable associated with that particular byte.

BRIEF DESCRIPTION OF THE DRAWINGS

These and other advantages of the present invention will become apparent upon reading the following specification and by reference to the drawings in which.

BEST MODE FOR CARRYING OUT THE INVENTION

Figure 1:
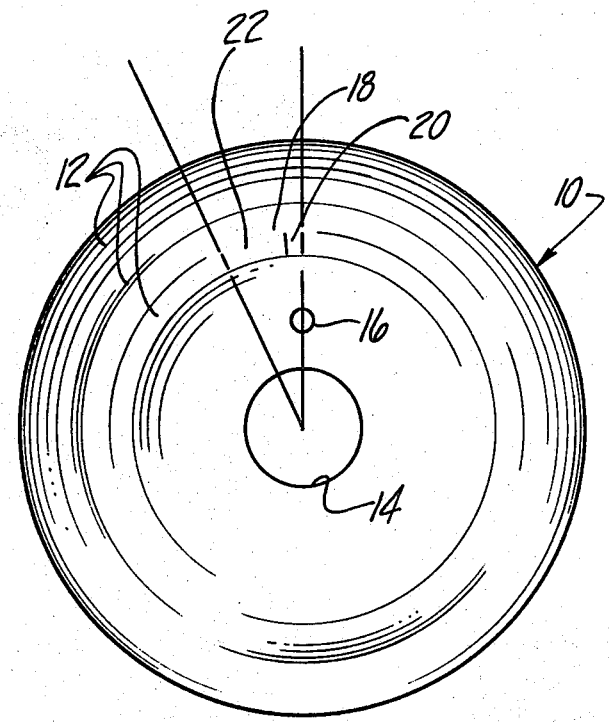
FIG. 1 is a plan view of a memory disk.

FIG. 1 shows a diskette 10 having a plurality of concentric tracks 12 disposed about a central hub 14. The drawing has been greatly simplified and only a few of tracks 12 are schematically illustrated. As those skilled in the art will readily realize, diskette 10 generally includes many such tracks. An index hole 16 is provided to provide a reference point for locating particular information written onto diskette 10.

The present invention finds particular utility with soft sectored diskettes. As noted above, each sector on a particular track must be identified by the appropriate header information. As shown in FIG. 1, sector 18 includes a header 20 which is followed by a portion 22 reserved for data. Ordinarily, the header information includes the track number, sector number, and other information depending upon the formatting convention used. The portion 22 reserved for data information is considerably larger than header 20. During formatting, the bytes written into the data portion 22 are merely used as fillers and are often referred to as dummy information. Often the dummy data information is a repetitive series of bytes having the same value.

Figure 2:
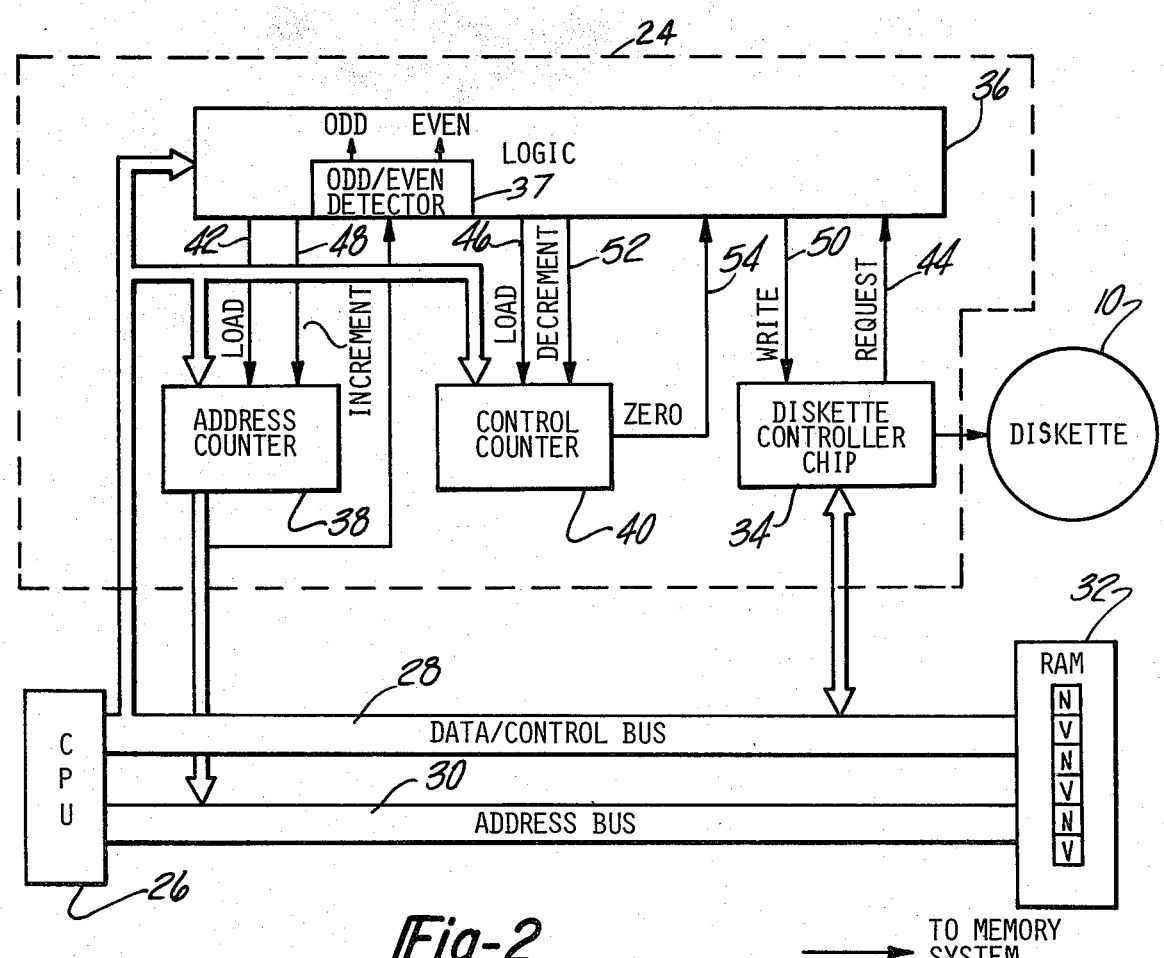
FIG. 2 is a schematic diagram of the preferred embodiment of the circuitry of the present invention.

FIG. 2 shows a schematic diagram of the preferred embodiment of the circuitry aspects of the present invention. A diskette controller system 24 is one module in a data processing computer system. The computer system includes a central processing unit (CPU) 26 which communicates with the diskette controller subsystem 24 over a data/control bus 28 and an address bus 30. The computer system also includes a random access memory (RAM) 32 which communicates with subsystem 24 over busses 28, 30. One feature of this invention is that the size of RAM 32 may be relatively small in comparison with prior art formatting techniques. Therefore, RAM 32 may be of an integrated circuit type conveniently mounted within the frame of the computer system. Regardless of the type of memory used, the amount of memory space required is substantially reduced pursuant to this invention.

Subsystem 24 includes a diskette controller chip 34 which serves to write information from RAM 32 onto the appropriate locations of diskette 10. Controller chip 34 operates to move a read/write head (not shown) to the various tracks on diskette 10 and appropriately time the reading and writing functions in a manner known in the art. Controller chip 34 may be the "Diskette Controller IC" number 1771 manufactured by Western Digital. During the formatting operation the controller chip is just used for writing information onto diskette 10.

Logic circuitry 36 controls most of the interpretive functions of subsystem 24. Circuitry 36 consists of conventional logic devices which are configured to form the functions to be discussed. Alternatively, the hard wired components could be replaced by simple microprocessor.

An address counter 38 in subsystem 24 is utilized to address or point to selected memory locations in RAM 32. Preferably, direct memory addressing (DMA) techniques are employed to fetch the pertinent contents of RAM 32 during the formatting operation. The address counter 38 is loaded with a particular address by CPU 26 over the data/control bus 28. Once loaded, the contents of address counter 38 are coupled to RAM 32 over address bus 30, with RAM 32 placing the contents of the addressed memory location onto data bus 28.

Subsystem 24 further includes a control counter 40. Control counter 40 is an eight bit counter which is capable of being loaded with a binary number over bus 28. Upon receipt of certain control signals from logic 36, the contents of counter 40 will change by a count of one. Upon reaching a predetermined count, the control counter 40 will provide a given output signal to logic 36. In the preferred embodiment, control counter 40 is a down counter which is decremented by the control signal over line 52 and provides an output signal on line 54 when its contents reaches zero.

Figure 3:
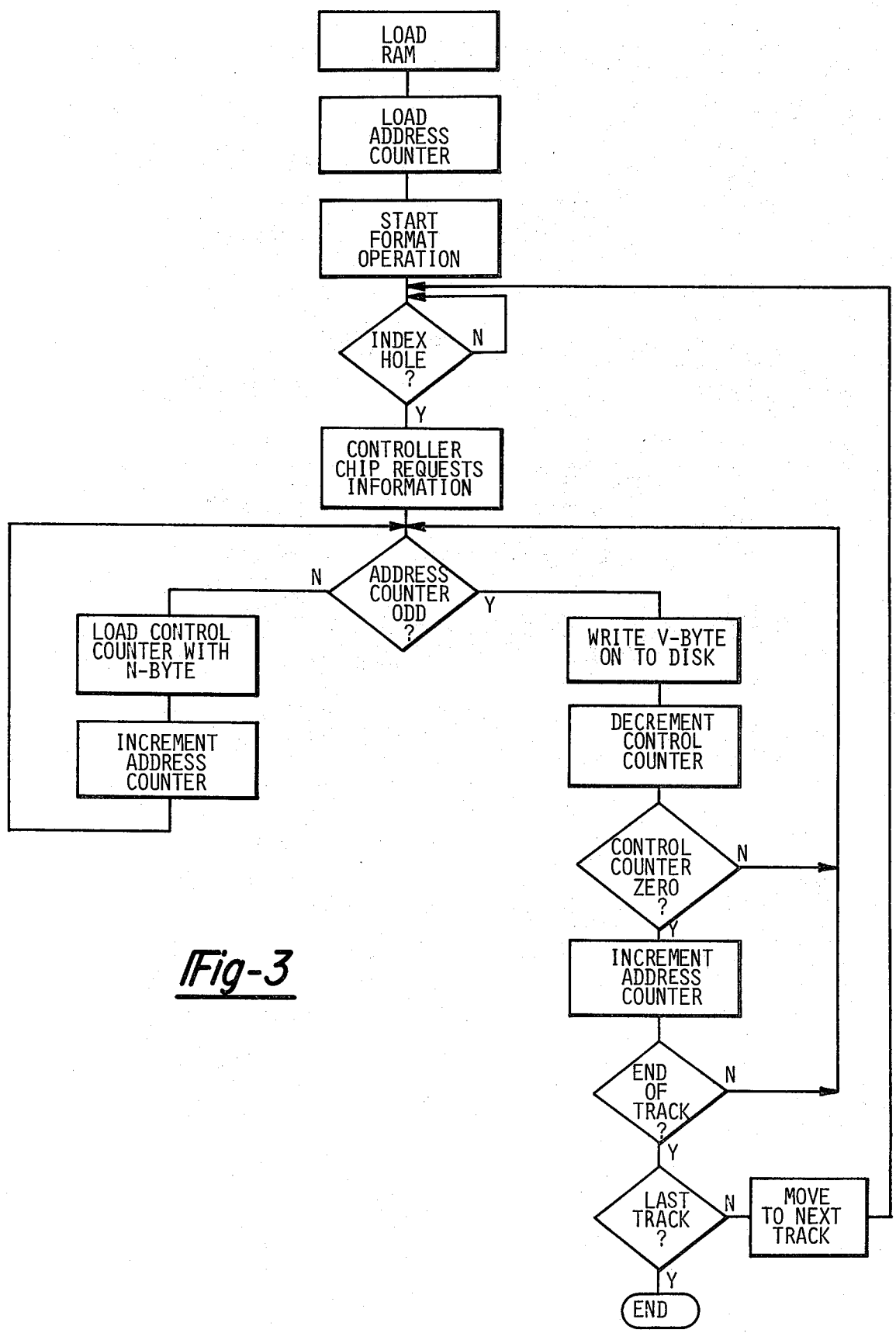
FIG. 3 is a flow chart illustrating the sequence of operations according to the preferred method of the invention.

With additional references to FIG. 3, the method of this invention will now be described. CPU 26 loads RAM 32 with the information necessary to perform the formatting operation. According to a feature of this invention, the information is loaded into RAM 32 in a table format having a plurality of two-byte packets which are stored in adjacent memory locations. Each packet contains an N-byte and a V-byte. The N-bytes contain a numerical variable which defines the number of times that the value contained in its associated V-byte will be written onto diskette 10. For example, if the binary value of 3 is to be written 100 times, the N-byte will contain the number 100 whereas the V-byte will contain the number 3. The N-bytes are stored in even memory address locations in RAM 32 and the V-bytes are stored in odd memory locations. Each sequentially different byte of information to be written onto diskette 10 contains its own N-byte preceeding it in RAM 32. Generally, the header information packets will preceed the data information packets.

The address counter 38 is then loaded with the address of the first entry in the RAM 32 table by CPU 26 placing the address on bus 28 and logic 36 issuing a load command. The first entry will be the even address numbers; e.g. 00, that contains the N-byte for the first packet. CPU 26 signals to logic 36 that the address counter 38 is loaded and that the subsystem 24 may begin writing onto diskette 10. After the address counter 38 has been loaded, CPU 26 is no longer needed in the formatting process for the present track.

Controller chip 34 moves the read/write head to the appropriate track on diskette 10 and begins to look for the index hole 16 therein. Upon sensing the index hole 16, controller chip 34 requests data from logic 36 over line 44.

Logic 36 interrogates the contents of address counter 38 to determine whether it contains an odd or even number. This could be accomplished by a variety of means such as the use of a flip flop 37 which toggles back and fourth every time the contents of address counter 38 is changed. With the address counter 38 containing an even number pointing to the N-byte of the first packet, it is loaded into control counter 40 over bus 28 by the generation of a load signal on line 46 by logic 36.

After the control counter 40 has been loaded, logic 36 increments address counter 38 by one through an appropriate signal on line 48. Now the contents of address counter 38 is odd in number, here, containing the address which points to the V-byte in the first packet. In response to the odd contents of the address counter 38, logic 36 enables controller chip 34 by placing a write command on line 50 to cause the V-byte information from data bus 28 to be written onto diskette 10.

Controller chip 34 then requests new information via a request signal to logic 36 on line 44. In response thereto, logic 36 decrements control counter 40 via line 52. If the thus decremented control counter 40 contents is not zero, logic 36 issues another write command to controller chip 34 to cause it to write the same V-byte data onto the next alotted portion on diskette 10. It is important to note that the contents of address counter 38 are not changed unless the control counter 40 has been decremented to zero. Thus, the address counter 38 remains pointing to a stationary location in RAM 32 containing the same V-byte for the number of times defined by its associated N-byte which has been previously loaded into control counter 40. It should be evident that a substantial savings in RAM 32 overhead is obtained by the present invention, especially where a large amount of dummy data information is repetitiously written onto the diskette 10. If, for example, it is necessary to write a string of 100 bytes of the digital number three onto diskette 10, the present invention requires only two memory locations in RAM 32 in comparison with the 100 locations needed by the prior art approach.

Once the control counter 40 reaches zero, the address counter 38 is incremented and the above process continues for the remainder of the track. After the track is full, controller chip 34 notifies the CPU 26. The CPU 26 now rewrites the N-V packets in RAM 32 to define the desired contents of the next track to be formatted, reinitializes the address counter 38 to point to the beginning of the N-V packet list in RAM 32, and commands diskette controller chip 34 to format the next track. This process continues until all of the tracks have been formatted.

In view of the foregoing it can now be understood that the present invention provides substantial advantages in the reduction of memory size requirements over the formatting techniques of the prior art. In addition, these memory size reduction advantages are gained without incurring real-time processing requirements as found in alternative schemes involving the use of uncompressed data and two short buffer areas. In such schemes CPU 32 would fill one buffer while diskette controller subsystem 24 was emptying the other buffer. Then, CPU 32 would fill the empty buffer while diskette controller subsystem 24 was emptying the first buffer. This alternating behavior would recur a multiplicity of times as required to transfer sufficient uncompressed data from CPU 32 to diskette 10 as necessary to fill (format) an entire track.

Various modifications of the present invention will become apparent to one skilled in the art after studying the specification, drawings and claims.

I claim:

1. Apparatus for formatting a memory disk (10) comprising:
    storage means (32) for storing information and a numerical variable associated therewith;
    a control counter (40);
    logic means (36) for loading said control counter with said numerical variable; and
    controller means (34) for writing said information onto said disk for a number of times defined by said numerical variable.

2. The apparatus of claim 1 wherein said information and numerical variable are stored in adjacent address locations in said storage means (32).

3. The apparatus of claim 2 further comprising:
    an address counter (38);
    processor means (26) for loading the address counter (38) with an address of a location in said storage means (32);
    detector means (37) for detecting whether the contents of the address counter (38) are odd or even;
    means (46, 52) for loading said control counter (40) with the numerical variable when the address counter (38) contents are of one type and then changing the contents of said address counter (38);
    means (50, 48) for coupling said information to said controller means (34) when the contents of the address counter are of another type and then changing the contents of said control counter (40); and
    (means (54) for generating a signal to initiate a change in the contents of said address counter (38) when the control counter (40) reaches a predetermined count.

4. The apparatus of claim 3 wherein each sequentially different information value has its own associated numerical variable.

5. The apparatus of claim 4 wherein said information and numerical variables are stored as packets in a table in said storage means (32), with said numerical variables preceeding their associated information in each packet.

6. A method of formatting a memory disk (10) comprising:
    storing information and a numerical variable associated therewith in a memory (32);
    loading a control counter (40) with said numerical variable; and
    writing said information onto said disk (10) for a number of times defined by said numerical variable.

7. The method of claim 6 wherein each sequentially different byte of information has its own associated numerical variable defining the number of times said byte is to be written onto said disk (10).

8. The method of claim 7 which further comprises:
    loading an address counter (38) with the address of a location in the memory (32);
    determining whether the contents of said address counter (38) are odd or even;
    loading said control counter (40) with a numerical variable when the address counter contents is of one type and then changing the contents of said address counter (38);
    writing the information in said memory location addressed by said address counter (38) onto said disk (10) when the contents of the address counter (38) is of another type, and then changing the contents of said control counter (40); and
    changing the contents of address counter (38) when the control counter (40) reaches a predetermined count.

9. A method of formatting a memory disk comprising:
    storing a string of packets in adjacent locations of a table in a memory (32), each packet containing a sequentially different byte of information to be written onto the disk (10) and a numerical variable defining the number of times that said byte is to be written onto the disk (10), said numerical variable being stored in even memory locations and its associated information byte being stored in the subsequent odd memory location;
    loading an address counter (38) with the first entry in the table;
    determining whether the contents of said address counter (38) are even or odd;
    loading a control counter (40) with the numerical variable if the contents of the address counter (38) are even, and then incrementing said address counter (38);
    writing the information byte addressed by said address counter (38) onto said disk (10) when the contents of the address counter (38) are odd, and then decrementing said control counter (46); and
    incrementing said address counter (38) when the control counter (40) reaches zero whereby said information byte is written onto said disk (10) for a number of times defined by its associated numerical variable.

10. The method of claim 9 wherein said bytes contain header and data information.

* * * * *